Aug. 28, 1951
W. S. PANGBORN
2,565,572
COUPLING
Original Filed Oct. 21, 1946
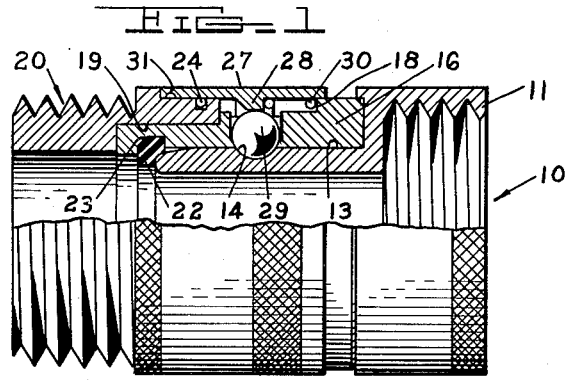
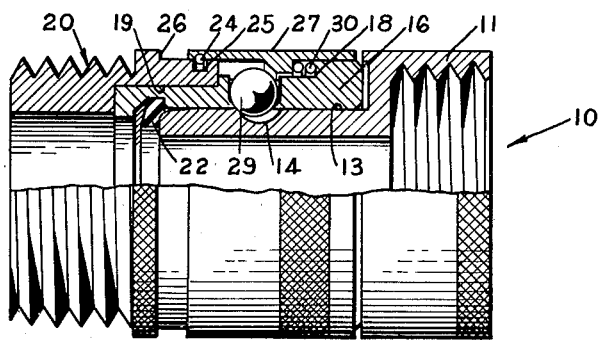
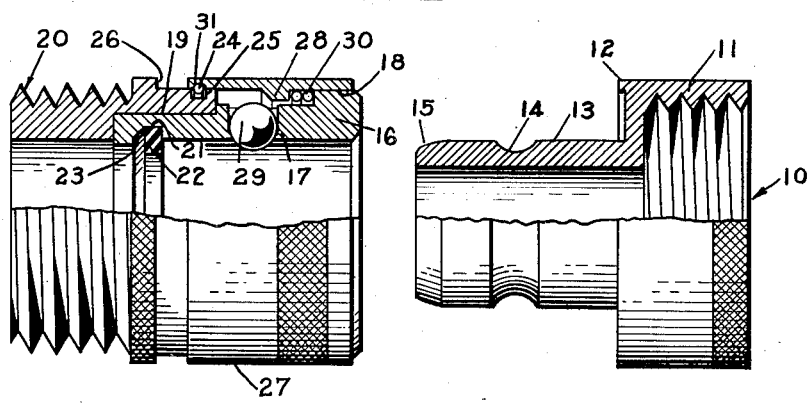
INVENTOR.
WALLACE S. PANGBORN
BY
ATTORNEYS Patented Aug. 28, 1951

2,565,572

UNITED STATES PATENT OFFICE 2,565,572

COUPLING

Wallace S. Pangborn, Detroit, Mich., assignor to Charles B. Kemp, Grosse Pointe, Mich.

Continuation of application Serial No. 692,029, October 21, 1946. This application December 23, 1949, Serial No. 134,667

8 Claims. (Cl. 285—168)

My invention relates generally to couplings and more particularly to hose couplings of the quickly detachable type.

This application is a continuation of my copending application Serial No. 692,029, filed October 21, 1946, now abandoned.

There have been heretofore numerous couplings of this type but most of them have had features which prevented them from attaining wide commercial success. Many of the couplings heretofore manufactured have been rendered too expensive and therefore, unavailable for garden hose use because of the cost of machining and assembling their numerous and intricate parts. Some have been so constructed that they uncouple accidentally when the hose is dragged along the ground. And others require the use of intricate washers and precision machining to provide a leak-proof connection.

It is accordingly an object of this invention to provide a coupling which is relatively simple in its construction and therefore inexpensive.

Another object of this invention is to provide a coupling the construction of which obviates the possibility of accidental uncoupling.

A further object of this invention is the provision of a coupling which can be coupled or uncoupled quickly and easily.

Still another object of this invention is to provide effective sealing means for this type of coupling which do not require the use of intricate washers or precision machining.

In the drawings:

Figure 1 is a side view partly in section showing the component members locked in a coupled position.

Figure 2 is a similar view showing the members in a partially separated condition.

Figure 3 is a similar view showing the members in a completely separated condition.

Referring to the drawings, 10 represents a male member having at one end a shoulder 11 with a horizontally protruding lip 12 at its outer periphery, said shoulder being internally threaded for attachment to a standard hose coupling. The other end of said member, which will be referred to as the forward end, comprises a reduced portion 13 having an annular groove 14 and terminating in a rounded edge at 15. The female member 16 is provided with ball retaining apertures 17, a shoulder 18 and a reduced portion 19 which is received as a press fit by the end hose adapter 20. The forward end of the female member 16 has an inner annular groove 21 which retains a flat compressible gasket 22. The forward edge 23 of said groove is inclined outwardly toward the threaded portion of the hose adapter 20. As can be seen from Figure 1 when the male member 10 is fully inserted in the female member 16 the rounded end 15 of the male member extends beyond the inner edge of said groove 21 thereby compressing the gasket 22 against the inclined surface 23 to provide a very simple but extremely effective leakproof joint.

An expandable snap ring 24 is retained on said end adapter 20 by an annular groove 25. Said end adapter 20 is also provided with a shoulder 26 which limits the forward motion of a horizontally movable sleeve 27. When said sleeve is in its forward position, an inward depending shoulder 28 depresses the ball members 29 in the apertures 17 to engage the annular groove 14 of the male member 10. A spring 30 which is compressed between shoulders 18 and 28 normally urges said sleeve 27 to assume its forward position. However, when the sleeve is moved rearwardly to disengage said ball members 29, an annular groove 31 on the inside of said sleeve is engaged by the expandable snap ring 24 thereby locking said sleeve in the rearward or disengaging position against the pressure of the spring 30.

Assuming that the coupling is in its locked position as illustrated in Figure 1 and it is desired to uncouple the connection, the sleeve 27 is grasped between the thumb and forefinger of one hand and pulled rearwardly until it is locked in the opened position by the snap ring 24. The shoulder 28 is thereby moved out of engagement with the ball members 29 and since the pressure on gasket 22 compressing it against the beveled surface 23 is released, the gasket springs back to its natural flat shape and thereby causes the male member 10 to spring outwardly from the female member 16. The coupling operation is performed with equal facility. The male member is inserted in the female member and pushed forwardly. When the forward end 15 of the male member 10, has compressed the gasket 22 against the beveled surface 23, the protruding lip 12 on the shoulder 11 has moved the sleeve 27 forward enough to disengage the snap ring 24. The spring 28 then urges the sleeve 27 forward and the shoulder 28 depresses and locks the ball members 29 in the groove 14 to retain the parts in a coupled condition with the forward end of the male member compressing the resilient washer 22 against the surface 23 thereby providing a leakproof connection.

Thus it can be seen that I have provided a simple but very effective coupling which in addition to permitting rotation of the male and female members, allows dragging of the coupled connection along the ground without any danger of uncoupling. It is also obvious that by means of the snap ring employed, the parts of the coupling can be coupled or uncoupled quickly and with ease and that the simple gasket sealing means provides a leak-proof connection without the necessity of intricate washers or precision machining of the respective members.

I claim:

1. A coupling comprising in combination a female member having a forward and rearward end and a bore therein extending to said rearward end, sockets spaced circumferentially of said bore and ball members movable radially within said sockets, a male member adapted to be inserted within the bore of said female member from the rear end thereof and having an annular groove adapted to be engaged by said ball members, a sleeve on said female member having an inwardly projecting shoulder arranged to depress said ball members into engagement with said annular groove when said sleeve is shifted forwardly on said female member and thereby lock said members in coupled relation, a shoulder on said female member for limiting the forward movement of said sleeve, spring means biasing said sleeve forwardly against said shoulder, means for holding said sleeve in a rearward position, and means associated with said male member and engageable with said sleeve for automatically releasing said sleeve from the restraining influence of said holding means whenever said male member is inserted fully within the bore of said female member.

2. The combination as set forth in claim 1 wherein said last-mentioned means comprises a shoulder on said male member positioned to abut against the rear end of said sleeve, the axial distance between the front edge of said shoulder and said annular groove being slightly less than the axial distance between said sockets and the rear end of said sleeve when the sleeve is held in said rearward position by said holding means.

3. A coupling comprising in combination a female member having a forward and rearward end and a bore therein extending to said rearward end, sockets spaced circumferentially of said bore and ball members movable radially within said sockets, a male member adapted to be inserted within bore of said female member from the rear end thereof and having an annular groove adapted to be engaged by said ball members, a sleeve on said female member having an inwardly projecting shoulder arranged to depress said ball members into engagement within said annular groove when said sleeve is shifted to a forward position on said female member and thereby lock said members in coupled relation, a circumferential shoulder at the forward end of said female member against which the forward edge of said sleeve is arranged to abut in locked position for limiting the forward movement of said sleeve, the outer diameter of said circumferential shoulder being at least as great as the outer diameter of said sleeve, spring means normally urging said sleeve forwardly into engagement with said annular shoulder and means for holding said sleeve in a rearward position against the tension of said spring means to permit free radial movement of said ball members, said last-mentioned means comprising an expandable snap ring on said female member and an annular groove in said sleeve arranged to engage said snap ring and thereby hold said sleeve in a rearward position when the sleeve is shifted rearwardly on said female member.

4. A coupling comprising in combination a female member having a forward and rearward end and a bore therein extending to said rearward end, sockets spaced circumferentially of said bore and ball members movable radially within said sockets, a male member adapted to be inserted within bore of said female member from the rear end thereof and having an annular groove adapted to be engaged by said ball members, a sleeve on said female member having an inwardly projecting shoulder arranged to depress said ball members into engagement within said annular groove when said sleeve is shifted to a forward position on said female member and thereby lock said members in coupled relation, a circumferential shoulder at the forward end of said female member against which the forward edge of said sleeve is arranged to abut in locked position for limiting the forward movement of said sleeve, the outer diameter of said circumferential shoulder being at least as great as the outer diameter of said sleeve, spring means normally urging said sleeve forwardly into engagement with said annular shoulder and means for holding said sleeve in a rearward position against the tension of said spring means to permit free radial movement of said ball members.

5. A coupling comprising in combination a female member having a forward and rearward end and a bore therein extending to said rearward end, sockets spaced circumferentially of said bore and ball members movable radially within said sockets, a male member adapted to be inserted within bore of said female member from the rear end thereof and having an annular groove adapted to be engaged by said ball members, a sleeve on said female member having an inwardly projecting shoulder arranged to depress said ball members into engagement within said annular groove when said sleeve is shifted to a forward position on said female member and thereby lock said members in coupled relation, a circumferential shoulder at the forward end of said female member against which the forward edge of said sleeve is arranged to abut in locked position for limiting the forward movement of said sleeve, the outer surface of said sleeve presenting a continuously smooth contour in an axial direction, the outer diameter of said circumferential shoulder being at least as great as the outer diameter of said sleeve and spring means normally urging said sleeve forwardly into engagement with said annular shoulder.

6. A coupling comprising in combination a female member having a forward and rearward end and a bore therein extending to said rearward end, sockets spaced circumferentially of said bore and ball members movable radially within said sockets, a male member adapted to be inserted within bore of said female member from the rear end thereof and having an annular groove adapted to be engaged by said ball members, a sleeve slidable on said female member and having an abutment thereon arranged to depress said ball members into engagement within said annular groove when said sleeve is shifted to a forward position on said female member and thereby lock said members in coupled relation, a circumferential shoulder at the forward end of said female member against which the forward edge of said sleeve is arranged to abut in locked position for limiting the forward movement of said sleeve, the outer surface of said sleeve presenting a continuously smooth contour in an axial direction, the outer diameter of said circumferential shoulder being at least as great as the outer diameter of the forward end of said sleeve and spring means normally urging said sleeve forwardly into engagement with said annular shoulder.

7. In a coupling of the type having a female member, a male member having a fluid conduction portion at one end insertable within the bore of said female member from the inlet end thereof and means for locking said members in coupled relation, means for sealing said coupling comprising an annular groove in the bore of said female member having a side wall beveled so that said groove is wider at its open end than at its base, said beveled side wall being more remote from said inlet end than the other sidewall of the groove, and a resilient washer in said groove, said washer being normally spaced from said beveled side wall and positioned within the bore of said female member at a distance from the inlet end thereof less than the length of that portion of the male member insertable within said bore so that when said male and female members are coupled the end face of the fluid conduction portion of said male member abuts against and flexes said resilient washer, said washer, when said male and female members are locked in coupled position, being distorted and compressed between the end face of the fluid conducting portion of said male member and the beveled sidewall of said annular groove.

8. In a coupling of the type having a female member, a male member having a fluid conduction portion at one end insertable within the bore of said female member from the inlet end thereof and means for locking said members in coupled relation, means for sealing said coupling comprising an annular groove in the bore of said female member having a side wall beveled so that said groove is wider at its open end than at its base, said beveled side wall being more remote from said inlet end than the other sidewall of the groove, and a resilient washer in said groove, said washer being normally spaced from said beveled side wall and positioned within the bore of said female member at a distance from the inlet end thereof less than the length of that portion of the male member insertable within said bore so that when said male and female members are coupled the end face of the fluid conduction portion of said male member abuts against and flexes said resilient washer, the beveled side wall of said annular groove providing a backing surface for said washer when flexed by said male member and limiting the degree of flexing of said washer.

WALLACE S. PANGBORN.

REFERENCES CITED

The following references are of record in the file of this patent:

UNITED STATES PATENTS

| Number | Name | Date |
| --- | --- | --- |
| 2,255,333 | Scheiwer | Sept. 9, 1941 |
| 2,377,812 | Scheiwer | June 5, 1945 |
| 2,386,270 | Samiran | Oct. 9, 1945 |